United States Patent [19]

Rogers et al.

[11] Patent Number: 4,845,058

[45] Date of Patent: Jul. 4, 1989

[54] PROCESS FOR IMPROVING STRENGTH OF SIC CERAMICS

[75] Inventors: John J. Rogers; John Semen, both of Baton Rouge, La.

[73] Assignee: Ethyl Corporation, Richmond, Va.

[21] Appl. No.: 164,398

[22] Filed: Mar. 4, 1988

[51] Int. Cl.$^4$ ............................................. C04B 35/56
[52] U.S. Cl. ....................................... 501/88; 264/63; 264/65
[58] Field of Search ....................... 264/63, 65; 501/88

[56] References Cited

U.S. PATENT DOCUMENTS

| | | | |
|---|---|---|---|
| 4,117,507 | 9/1978 | Yajima et al. | 264/63 |
| 4,482,669 | 11/1984 | Seyferth et al. | 524/442 |
| 4,560,526 | 12/1985 | Okumura | 264/63 X |
| 4,645,807 | 2/1987 | Seyferth et al. | 525/474 |
| 4,650,837 | 3/1987 | Seyferth et al. | 525/478 |
| 4,659,850 | 4/1987 | Arai et al. | 556/409 |

FOREIGN PATENT DOCUMENTS

| | | | |
|---|---|---|---|
| 2833904 | 2/1979 | Fed. Rep. of Germany | 501/88 |
| 8500363 | 1/1985 | PCT Int'l Appl. | 501/88 |

OTHER PUBLICATIONS

Wiseman, "The Developement and Application of Polysilazane Precursors to Ceramics", M.I.T. Thesis, Aug. 1984.

Shin Nisso Kako Co., "SiC Products by PPMC Process", Specification Sheet.

*Primary Examiner*—William R. Dixon, Jr.
*Assistant Examiner*—Karl Group
*Attorney, Agent, or Firm*—Patricia J. Hogan

[57] ABSTRACT

The strength of SiC ceramic parts derived from certain preceramic compositions is improved by (A) cooling the parts in an inert atmosphere to a temperature at least as low as about 800° C. after preparing them by molding and pyrolyzing the preceramic compositions, (B) then heating them in air to about 1200°–1300° C., and (C) keeping them in air at that temperature for at least about one hour before allowing them to cool. The preceramic compositions from which the ceramics are derived are mixtures of SiC powders and polysilazanes having an alkali metal content of 0–100 ppm and prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

7 Claims, No Drawings

PROCESS FOR IMPROVING STRENGTH OF SIC CERAMICS

FIELD OF INVENTION

This invention relates to improved silicon carbide (SiC) ceramics, i.e., ceramics composed predominantly of SiC, and more particularly to a process for improving their strength.

BACKGROUND

As disclosed in U.S. Pat. Nos. 4,117,057 (Yajima et al.) and 4,560,526 (Okumura et al.), it is known that ceramics can be prepared from mixtures of SiC powder and a preceramic binder and that the strengths of the ceramics decrease with decreasing density. An unfortunate result of this strength/density relationship is that ceramics having typical densities (i.e., about 2.0-2.5 g/cc) have generally not been obtainable with sufficiently high bending strengths (i.e., at least about 20, preferably at least about 28 kg/mm$^2$) to make them commercially attractive.

A Shin Nisso Kako Co., Ltd. product specification sheet, "SiC Products by PPMC Process," indicates that ceramics having a density of 2.3 g/cc and bending strengths of 20-30 kg/mm$^2$ can be obtained from a mixture of SiC powder, polysilastyrene, and an organic lubricant. However, independent measurements of disc specimens provided by Shin Nisso show the bending strengths of these ceramics to be only about 18-21 kg/mm$^2$ and the specific strengths, i.e., the bending strength/density ratios, to be only about 9.6-11.1 (kg/mm$^2$)/(g/cc). This represents an improvement over the strengths of previously known low density SiC ceramics but not as much of an improvement as might be desired.

U.S. Pat. Nos. 4,482,669 (Seyferth et al.-I), 4,645,807 (Seyferth et al.-II), 4,650,837 (Seyferth et al.-III), and 4,659,850 (Arai et al.) disclose the utility of polysilazanes as preceramic materials, and Seyferth et al.-I teach that their polysilazanes are especially useful as binders for ceramic powders such as SiC. SiC ceramics prepared from these SiC powder/polysilazane binder compositions are composed predominantly of SiC, e.g., about 80-90% SiC, with the balance being mostly silicon nitride. Seyferth et al.-I do not disclose the typical densities and bending strengths of ceramics made from their preceramic compositions. However, Wiseman, "The Development and Application of Polysilazane Precursors to Ceramics," a Massachusetts Institute of Technology thesis, 1984, shows that these densities were generally about 2.0-2.4 g/cc and the bending strengths were poor. Wiseman shows a recognition, though, of its being desirable to minimize alkali metal contamination and to use preceramic polymers having a sufficiently high molecular weight, or mixtures (such as 80/20 mixtures) of such polymers with lower molecular weight polymers, to maximize strength.

Copending application Ser. No. 120,102 (Semen et al.), filed Nov. 13, 1987, teaches that high strength/low density SiC ceramics can be prepared from the polysilazanes of Seyferth et al.-I when mixtures of the polysilazanes with SiC powders have particle sizes not larger than about 105 micrometers, i.e., when the SiC/polysilazane particles are small enough to pass through a 105-micrometer sieve. However, even though the as-pyrolyzed strengths of the ceramics obtained from these preceramic compositions are good, it would be desirable to improve them, as well as to improve the strengths of ceramics derived from preceramic compositions having larger particle sizes.

SUMMARY OF INVENTION

An object of this invention is to provide a novel process for improving the strength of SiC ceramics derived from mixtures of SiC powders and the polysilazanes of Seyferth et al.-I.

This and other objects are attained by (A) molding a preceramic composition comprising about 50-85% by weight of SiC powder and about 15-50% by weight of a preceramic polysilazane binder at a temperature of about 60°-225° C., said binder having an alkali metal content of 0-100 ppm and being a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, (B) pyrolyzing the molded composition in an inert atmosphere to a temperature of about 1200°-1450° C., (C) cooling the resultant ceramic part in an inert atmosphere to a temperature at least as low as about 800° C., (D) heating it in air to about 1200°-1300° C., and (E) keeping it in air at about 1200°-1300° C. for at least about one hour before allowing it to cool.

DETAILED DESCRIPTION

SiC powders that can be employed in the practice of the invention are commercially-available materials that vary from very fine to coarse powders. However, the preferred SiC powders are those which have a particle size of about five micrometers or less, preferably one micrometer or less; and particularly good results have been obtained with SiC powders having a substantially spherical particle shape and mean particle sizes of about 0.2-5.0 micrometers, preferably 0.2-1.0 micrometer. Both alpha-SiC and beta-SiC are utilizable.

The binder that is mixed with the SiC powder is a polysilazane of Seyferth et al.-I (the teachings of which are incorporated herein in to by reference), i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, or a mixture of such polysilazanes. For example, it may be one or more polysilazanes prepared by reacting methyldichlorosilane with ammonia, treating the ammonolysis product with potassium hydride, and quenching the resultant product with methyl iodide or dimethylchlorosilane. The utilizable polysilazanes are solids which are soluble in common organic solvents, such as aliphatic or aromatic hydrocarbons, dialkyl or alicyclic ethers, etc., including solid mixtures of normally solid polysilazanes and normally liquid polysilazanes. The solid, soluble polysilazanes having the higher molecular weights are preferred to permit the use of faster pyrolysis rates.

The polysilazane that is utilized should have an alkali metal content not higher than about 100 ppm, preferably not higher than about 5 ppm. When the polymer as prepared contains more than that amount of alkali metal contaminant, the degree of contamination can be reduced in any suitable manner, such as by filtration of a solution of the polysilazane in an organic solvent.

The amount of polysilazane used is such that the preceramic composition comprises about 50–85% by weight of SiC powder and about 15–50% by weight of binder, preferably about 70–80% by weight of SiC powder and about 20–30% by weight of binder.

If desired, the compositions may be modified by the inclusion of optional ingredients, such as polyisobutenyl succinimides, other dispersing agents, and other additives that have been used in known ceramic molding compositions. For example, one or more lubricants such as higher fatty acids and the esters and amides thereof, higher alcohols, paraffin wax, and low molecular weight polyolefins can be used. When employed, such additives are used in minor amounts, e.g., up to about 5% by weight of dispersing agent or up to about 15% by weight of a lubricant, based on the weight of the remainder of the composition.

The preceramic compositions of the invention are prepared by intimately mixing the SiC powder and binder and, when the preceramic compositions of Semen et al. are desired, pulverizing the mixture to form particles having a particle size smaller than 105 micrometers, as hereinabove defined, and separating from those particles any particles having a particle size larger than about 105 micrometers. Neither the particular manner in which the SiC powder and binder are mixed nor the particular manner in which the particle size is reduced appears to be critical. For example, mills in general are useful for the reduction in particle size when such reduction is desired. However, it is particularly convenient to conduct the process by dispersing the SiC powder in an organic solvent solution of the binder (e.g., a solution in an aliphatic or aromatic hydrocarbon, such as hexane, toluene, etc., or a dialkyl or alicyclic ether, such as diethyl ether, tetrahydrofuran, etc.), preferably at room temperature, removing the solvent (e.g., by rotary evaporation followed by vacuum distillation), ball milling the resultant chunks of powder/binder, and then sieving to remove any particles having a particle size larger then about 105 micrometers.

Ceramics may be prepared from the preceramic compositions, as in Semen et al., by molding them at a temperature and pressure suitable for the parts being made, usually at a temperature of about 60°–225° C. and a pressure of about 7000–343,000 kPa, using any suitable shaping process, such as compression, injection, or transfer molding, or extrusion, and then pyrolyzing the molded composition in an inert atmosphere, such as nitrogen, argon, etc., to a temperature of about 1200°–1450° C., preferably about 1300° C. The time required for the pyrolysis varies with the ultimate pyrolysis temperature, being at least one hour at the preferred pyrolysis temperature of about 1300° C., a shorter time at higher temperatures, and a longer time at lower temperatures. It is particularly useful to pyrolyze the molded composition by (1) heating it to 1300° C. at rates of 60° C./hour from room temperature to 60° C., 30° C./hour from 60° C. to 260° C., 120° C./hour from 260° C. to 1260° C., and 60° C./hour from 1260° C. to 1300° C., maintaining the temperature at 1300° C. for one hour, cooling to 900° C. at a rate of 120° C./hour, and conducting the remainder of the cooling at an ambient rate (i.e., shutting down the furnace heaters when the temperature reaches 900° C. and allowing the resultant furnace conditions to determine the rate of the remainder of the cooldown) or (2) heating it to 1400° C. at rates of 60° C./hour from room temperature to 60° C., 15° C./hour from 60° C. to 260° C., 120° C./hour from 260° C. to 1260° C., and 60° C./hour from 1260° C. to 1400° C., maintaining the temperature at 1400° C. for 45 minutes, and cooling to the desired temperature of about 800° C. or less.

After the ceramic part resulting from the pyrolysis has been cooled in an inert atmosphere to a temperature of about 800° C. or less, preferably to about 800° C., it is heated in air to about 1200°–1300° C., preferably about 1300° C., and kept in air at this temperature for at least about one hour before allowing it to cool. This air aging of the ceramic part results in improving its bending strength—a result that is surprising, since a comparable air aging of ceramic parts derived from different preceramic compositions results in decreasing the bending strength.

The invention is advantageous as a means of improving the strengths of ceramics derived from preceramic compositions which have not previously been found capable of yielding ceramics of such high strength. This improvement in strength makes the ceramics particularly desirable for use in aerospace and other demanding and critical structural applications.

The following examples are given to illustrate the invention and are not intended as a limitation thereof. In the processes described in these examples, thoroughly-dried equipment, purified raw materials, and an inert atmosphere were used to protect the polysilazanes from attack by water and other substances having active hydrogens during synthesis and storage of the polysilazanes and during processing and storage of the polysilazane-containing materials used to make the SiC ceramics.

EXAMPLE I

Synthesis of Polysilazane A

Part A

A suitable reaction vessel was charged with 14 L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below about 400 kPa, and the reaction temperature stayed in the range of 0°–10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel which had previously been charged with a suspension of 3.6 g (0.089 mol) of KH powder in about 100 mL of anhydrous tetrahydrofuran and chilled to 0° C. to begin the polymerization reaction. The reaction mixture was maintained at 0° C. for about 8 hours and then allowed to warm gradually to about 22° C. After a total of about 26 hours of polymerization at 0°–22° C., the reaction was quenched by adding about 12.6 g (0.13 mol) of dimethylchlorosilane to the polymerization solution.

The polymer product was isolated by (1) concentrating the product solution to about 4L volume by vacuum distillation, (2) centrifuging the concentrated solution to obtain a clear supernatant and a white precipitate, (3) decanting off the supernatant from the precipitate, (4) flashing off the volatiles from the supernatant by vacuum distillation, (5) redissolving the residue in anhydrous hexane, (6) filtering the hexane solution through a 0.2-micrometer Teflon filter, and (7) flashing off the volatiles from the filtrate by vacuum distillation to provide a white solid which was designated as Polysilazane A. Proton NMR spectra of the polymer in deuterated chloroform solvent had resonances consistent with those reported in Seyferth et al.-I for polysilazane and with a small amount of residual hexane. Elemental oxygen by neutron activation was about 0.4%, and the potassium content was determined by inductively coupled plasma emission spectroscopy to be less than 5 ppm, based on the weight of polymer.

EXAMPLE II

Synthesis of Polysilazane B

Example I was essentially repeated except that the amount of KH employed was 0.48 mol %, based on the amount of methyldichlorosilane charged in the ammonolysis reaction, and the total polymerization time at 0°-22° C. was 24 hours. The crude polymer product was dried to remove the solvent, after which the dry residue was redissolved in anhydrous cyclohexane, the cyclohexane solution was filtered, and the filtrate was vacuum dried. The Polysilazane B formed by the process was a solid having a tetrahydrofuran content of 2.2% by weight, a cyclohexane content of about 7%, an elemental oxygen content of 0.2% (corrected for residual solvent), and a potassium content of less than 5 ppm.

EXAMPLE III

Synthesis of Polysilazane C

Example I was essentially repeated except that the reaction mixture for the polymerization was prepared by adding the KH suspension to the ammonolysis product, the amount of KH employed was 0.6 mol %, based on the amount of methyldichlorosilane charged in the ammonolysis reaction, and the polymerization was conducted entirely at 0° C. for a total of 0.7 hour. The Polysilazane C formed by the process was a viscous liquid having a tetrahydrofuran content of 0.5% by weight, an elemental oxygen content of 0.4% (corrected for residual solvent), and a potassium content of less than 5 ppm.

EXAMPLE IV

Synthesis of Polysilazane D

Example I was essentially repeated except that the total polymerization time was 18 hours, and the amount of KH employed was 0.59 mol %, based on the amount of methyldichlorosilane charged in the ammonolysis reaction. The crude polymer product was vacuum dried to remove the solvent, after which the dry residue was redissolved in anhydrous hexane, the hexane solution was centrifuged, the supernatant was decanted off, and the decanted supernatant was vacuum dried. The Polysilazane D formed by the process was a solid having a tetrahydrofuran content of about 2.7% by weight, a hexane content of about 6.5% by weight, an elemental oxygen content of 0.3% by weight (corrected for residual tetrahydrofuran solvent), and a potassium content of about 2000 ppm.

EXAMPLE V

Synthesis of Polysilazane E

Example III was essentially repeated except that the polymerization time at 0° C. was 10 hours. The Polysilazane E formed by the process was a solid having a potassium content of about 10 ppm. It was not analyzed for impurities other than potassium.

EXAMPLE VI

Synthesis of Polysilazane F

Example III was repeated to form another viscous liquid which was designated as Polysilazane F. It was not analyzed for impurities.

EXAMPLE VII

Synthesis of Polysilazane G

Example I was essentially repeated except that a centrifugal filter was used to remove particulates from the crude ammonolysis product mass, the KH suspension was added to the ammonolysis product, the polymerization reaction mixture was maintained at 0° C. for about 18 hours and then allowed to warm gradually to about 22° C., and the total polymerization time at 0°-22° C. was about 22 hours. The crude polymer product was vacuum distilled until about 5L of concentrated solution remained, the concentrated solution was ultrafiltered to remove particulates, and the filtrate was vacuum dried to remove the solvent. The Polysilazane G formed by the process was a solid. It was not analyzed for impurities.

The following examples describe molding formulations prepared from the polysilazanes of the preceding examples and a beta-SiC powder having an average particle size of 0.27 micrometer and a specific surface area of 20.3 m$^2$/g.

EXAMPLE VIII

Preparation of Formulation I

A mixture of 28 g of Polysilazane B and 7.2 g of Polysilazane C in 500 g of anhydrous toluene was stirred magnetically for about 30 minutes to obtain a homogeneous solution, after which 84 g of SiC powder and 0.6 g of a commercial polyisobutenyl succinimide dispersant were added to the solution. The mixture was ultrasonicated for about one hour to disperse the SiC powder, and the majority of the toluene was then flashed off to provide a non-flowing gray residue. The residue was dried under high vacuum for several days and then pulverized lightly with a mortar/pestle to obtain a free-flowing powder. The free-flowing powder was ball milled for about one hour with about 200 cc of silicon carbide milling balls having a diameter of about 0.25 inch in a 2.5-pint mill jar, after which the milling balls were removed. The milled powder was then dry-sieved through a screen having size openings of 106 micrometers to isolate two fractions—about 50 g of powder that passed through the screen and about 70 g of powder that was retained by the screen. The milling and dry-sieving process was iteratively repeated on the powder that was retained on the screen until virtually all of the powder passed through the screen. About 100 g of this small particle size powder was obtained and was designated as Formulation I.

EXAMPLE IX

Preparation of Additional Formulations

The general procedures of Example VIII, i.e., slurry-blending, ultrasonicating, drying, coarse-grinding, milling, and dry sieving, were used to prepare additional formulations having the compositions shown in Table I. The dispersant included in the formulations was a commercial polyisobutenyl succinimide dispersant.

TABLE I

| Formulation | Ingredient | Parts |
|---|---|---|
| II | Polysilazane E | 20 |
|  | Polysilazane F | 5 |
|  | SiC | 75 |
|  | Dispersant | 0.5 |
| III | Polysilazane E | 12 |
|  | Polysilazane F | 3 |
|  | SiC | 85 |
|  | Dispersant | 0.5 |
| IV | Polysilazane E | 16 |
|  | Polysilazane F | 4 |
|  | SiC | 80 |
|  | Dispersant | 0.5 |
| V | Polysilazane E | 24 |
|  | Polysilazane F | 6 |
|  | SiC | 70 |
|  | Dispersant | 0.5 |
| VI | Polysilazane E | 28 |
|  | Polysilazane F | 7 |
|  | SiC | 65 |
|  | Dispersant | 0.5 |
| VII | Polysilazane A | 30 |
|  | SiC | 70 |
|  | Dispersant | 0.5 |
| VIII | Polysilazane A | 24 |
|  | Polysilazane C | 6 |
|  | SiC | 70 |
|  | Dispersant | 0.5 |
| IX | Polysilazane D | 24 |
|  | Polysilazane C | 6 |
|  | SiC | 70 |
|  | Dispersant | 0.5 |
| X | Polysilazane G | 20 |
|  | Polysilazane E | 5 |
|  | SiC | 75 |
|  | Dispersant | 0.5 |

EXAMPLE X

Molding of Formulation I

Each of 18 green discs having a nominal diameter of 12.7 mm and a nominal thickness of 2.5 mm was molded from Formulation I. In the preparation of each of these discs, about 0.8 g of the formulation was loaded into a suitable mold in a nitrogen glovebox; and the mold was evacuated to less than about 130 pascals, sealed under vacuum, transported to a hydraulic press, reconnected to a vacuum line, and evacuated to a pressure of not more than about 67 pascals—a vacuum level that was maintained throughout the remainder of the molding process. The evacuated mold was placed on the press platen, which was preheated to about 182° C. and allowed to preheat for 10 minutes, after which a force of about 2270-2720 kg (176,000-211,000 kPa pressure) was applied to the mold and maintained for about five minutes. After compression, the mold was sealed under vacuum and transported back into the glovebox, where it was allowed to cool for about five minutes. After cooling, the molded green disc was removed from the mold and stored in the glovebox. The density was determined to be 2.06 g/cc.

EXAMPLE XI

Pyrolysis of Formulation I

The green discs prepared in Example X were pyrolyzed in a nitrogen atmosphere by heating them to 1300° C. at rates of 60°/hour from room temperature to 60° C., 30° C./hour from 60° C. to 260° C., 120° C./hour from 260° C. to 1260° C., and 60° C./ hour from 1260° C. to 1300° C., maintaining the temperature at 1300° C. for four hours, cooling to 900° C. at a rate of 120° C./hour, and allowing ambient-rate cooldown from 900° C. to about room temperature, i.e., shutting down the furnace heaters when the temperature reached 900° C. and allowing the resultant furnace conditions to determine the rate of the remainder of the cooldown. After the pyrolyzed specimens had cooled to below 100° C., they were removed from the furnace and stored immediately in a dry nitrogen atmosphere. Their densities were calculated from weight and dimension data to be 2.22 g/cc. All of the disc specimens underwent uniform, linear shrinkage of about 6% as a result of the pyrolysis.

The pyrolyzed specimens were subsequently stored in air at ambient temperature and humidity for several weeks, during which time their weight increased by 2-3%—the maximum weight gain having been reached in about seven days. After the specimens had equilibrated to constant weight, the bending strengths of six of the specimens were determined by the biaxial-loading-stress method described in Godfrey, *Materials Science & Technology*, Vol. 1, No. 7 (1985), pp. 510-515. The discs formed from Formulation I were determined to have an average bending strength of 31.2 kg/mm$^2$. The remaining 12 disc specimens (untested) were retained for subsequent processing.

EXAMPLE XII

Aging of Pyrolyzed Specimens of Formulation I in Air

Six of the pyrolyzed disc specimens of Example XI were aged in an air atmosphere by heating them to 1300° C. at a rate of 120° C./hour, maintaining the temperature at 1300° C. for three hours, cooling to 900° C. at a rate of 120° C./hour, and allowing ambient-rate cooldown from 900° C. to about room temperature. The densities of the resulting specimens were calculated from weight and dimension data to be 2.27 g/cc. The average bending strength of the six aged discs, as determined by the method of Example XI, was 39.9 kg/mm$^2$ vs only 31.2 kg/mm$^2$ for the discs not aged in air at 1300° C.

The remaining six pryolyzed disc specimens of Example XI were aged in an air atmosphere by heating them to 1300° C. at a rate of 120° C./hour, maintaining the temperature at 1300° C. for only one hour, cooling to 900° C. at a rate of 120° C./hour and allowing ambient-rate cooldown from 900° C. to about room temperature. The densities of the resulting specimens were about 2.27 g/cc and the average bending strength of the resulting specimens was 38.2 kg/mm$^2$. Thus, a hold time at 1300° C. as short as one hour for the air aging process of this example substantially improved the bending strength relative to the unaged ceramic.

EXAMPLE XIII

Determination of Ingredient Ratio Effect

Additional green discs of Formulations III through VI were molded using the procedure of Example X.

The green discs were pyrolyzed in a nitrogen atmosphere by heating them to 1300° C. at the rates used in Example XI, maintaining the temperature at 1300° C. for one hour, and cooling to about room temperature at the rates used in Example XI. The pyrolyzed specimens were subsequently stored in air at ambient temperature and humidity for several days. A portion of each sample of discs was strength-tested with the method of Example XI, and the average strength thus obtained was designated the as-pyrolyzed bending strength. The remaining disc specimens were aged in an air atmosphere by heating them to 1200°–1300° C. at a rate of 120° C./hour, maintaining the temperature at 1200°–1300° C. for 50 hours, cooling to 900° C. at a rate of 120° C./hour, and allowing ambient-rate cooldown from 900° C. to about room temperature. The average bending strengths of the aged specimens as measured by the method of Example XI are reported in Table II. The data of Table II clearly demonstrate that the strengths of pyrolyzed discs prepared from formulations containing about 15–35% by weight polysilazane binder and about 65–85% by weight SiC powder are substantially improved by the air aging process of this Example.

TABLE II

| Formulation | As-Pyrolyzed Bending Strength (kg/mm$^2$) | Bending Strength after Aging 50 h in Air | |
|---|---|---|---|
| | | 1200° C. (kg/mm$^2$) | 1300° C. (kg/mm$^2$) |
| III | 22.3 | 34.7 | 26.8 |
| IV | 27.1 | 44.4 | — |
| V | 27.9 | 41.9 | — |
| VI | 26.2 | 38.9 | 41.2 |

EXAMPLE XIV

Aging of Pyrolyzed Specimens of Formulation II in Air

Green discs of Formulation II were molded as in Example X, pyrolyzed in a nitrogen atmosphere to 1300° C. at the heating and cooling rates of Example XI except that the temperature was maintained at 1300° C. for only one hour, and stored in air at ambient temperature and humidity for only about 30 minutes prior to beginning the following aging cycle in an air atmosphere: heating to 1300° C. at a rate of 120° C./hour, maintaining the temperature at 1300° C. for 3 hours, cooling to 900° C. at a rate of 120° C./hour, and cooling from 900° C. to about room temperature at ambient rate. The average bending strength of the aged discs was 42.8 kg/mm$^2$ vs. only 27.9 kg/mm$^2$ for the as-pyrolyzed discs.

EXAMPLE XV

Determination of the Effect of Potassium in the Polysilazane

Green discs of Formulations VII through IX were molded as in Example X and pyrolyzed and cooled to room temperature as in Example XIV. The pyrolyzed specimens were stored in an air atmosphere at ambient temperature and humidity for several days, after which the specimens were aged in an air atmosphere at 1300° C. by heating the specimens at a rate of 120° C./hour to 1300° C., maintaining the temperature at 1300° C. for 50 hours, cooling to 900° C. at a rate of 120° C./hour, and cooling from 900° C. to about room temperature at ambient rate. The average bending strengths of the resulting aged and as-pyrolyzed discs are given in Table III.

TABLE III

| Formulation | K Content of Polysilazane (ppm) | As-Pyrolyzed Bending Strength (kg/mm$^2$) | Bending Strength after 50 h Aging in Air a 1200° C. (kg/mm$^2$) |
|---|---|---|---|
| VII | <5 | 29.7 | 45.3 |
| VIII | <5 | 31.2 | 36.8 |
| IX | 1600 | 33.3 | 13.8 |

These data clearly demonstrate that the air-aging process does not improve the strength of ceramics made from formulations containing a high level of potassium.

EXAMPLE XVI

Part A

Preferred Air Aging Process

Twelve green discs of Formulation X were molded as in Example X. Six of the green discs were pyrolyzed in a nitrogen atmosphere and aged in an air atmosphere with the following procedure: heating the green discs in a nitrogen atmosphere to 1300° C. at the rates of Example XI, maintaining the temperature at 1300° C. for one hour, cooling the pyrolyzed discs in nitrogen to 800° C. at the rate of 120° C./hour, changing the furnace atmosphere to an air atmosphere at 800° C., heating the discs in air to 1300° C. at a rate of 120° C./hour, maintaining the temperature at 1300° C. for an additional time period of three hours, cooling from 1300° C. to 900° C. at a rate of 120° C./hour, and cooling from 900° C. to about room temperature at ambient rate to obtain aged ceramic discs, which were designated Ceramic I. The remaining six green discs of Formulation X were pyrolyzed to 1300° C. in a nitrogen atmosphere at the heating and cooling rates used to pyrolyze green discs of Formulation I in Example XI. The resulting pyrolyzed discs were designated Ceramic I-As-Pyrolyzed Control. The average bending strengths and average densities of Ceramic I and Ceramic I-As-Pyrolyzed Control were determined by the methods of Example XI.

Part B

Comparative Air Aging Process

Green discs of Formulation I were molded as in Example X, and these specimens were pyrolyzed in a nitrogen atmosphere and subsequently aged in an air atmosphere with the following comparative procedure: heating the green discs in a nitrogen atmosphere to 1300° C. at the rates of Example XI, maintaining the temperature at 1300° C. for one hour, changing the nitrogen atmosphere to an air atmosphere, maintaining the temperature at 1300° C. for an additional time period of three, ten, or fifteen hours, and cooling from 1300° C. to about room temperature in an air atmosphere at the cooling rates of Example XV to obtain aged ceramic specimens, which were designated Ceramic II, Ceramic III, and Ceramic IV (obtained with additional hold times in an air atmosphere at 1300° C. of three, ten, and fifteen hours, respectively). Some of the green discs of Formulation I were pyrolyzed to 1300° C. in a nitrogen atmosphere and cooled to about room temperature in a nitrogen atmosphere at the same heating and cooling rates used to make Ceramic I-As-Pyrolyzed Control; the pyrolyzed discs thus obtained were designated Ceramic II-IV -As-Pyrolyzed Control. The average bending strengths and average densities of Ceramics II-IV and the As-Pyrolyzed Control were determined by the methods of Example XI.

The average bending strengths and average densities of Ceramics I-IV are given in Table IV. These data clearly demonstrate that the aging process used to make Ceramic I of this example leads to a substantial improvement in the bending strength relative to the unaged control (as-pyrolyzed ceramic); moreover, this aging process requires significantly shorter processing times than the equally-effective processes of Examples XII-XV and is, therefore, a preferred process. In contrast, the comparative process used to prepare Ceramics II-IV of this example is surprisingly ineffective in improving the strength of the SiC ceramics made by the pyrolysis of the molding formulations of this invention.

TABLE IV

|  | Average Bending Strength (Kg/mm$^2$) | Average Density (g/cc) |
|---|---|---|
| Ceramic I | 48.5 | 2.32 |
| Ceramic I - As-Pyrolyzed Control | 35.1 | 2.30 |
| Ceramic II | 28.4 | 2.26 |
| Ceramic III | 32.1 | 2.26 |
| Ceramic IV | 33.1 | 2.23 |
| Ceramic II-IV - As-Pyrolyzed Control | 29.0 | 2.21 |

It is obvious that many variations can be made in the products and processes set forth above without departing from the spirit and scope of this invention.

What is claimed is:

1. A process for preparing a ceramic which comprises (A) molding a preceramic composition comprising about 50-85% by weight of SiC powder and about 15-50% by weight of a preceramic polysilazane binder at a temperature of about 60°-225° C., said binder having an alkali metal content of 0-100 ppm and being a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, (B) pyrolyzing the molded composition in an inert atmosphere to a temperature of about 1200°-1450° C., (C) cooling the resultant ceramic part in an inert atmosphere to a temperature at least as low as about 800° C., (D) heating it in air to about 1200°-1300° C., and (E) keeping it in air at about 1200°-1300° C. for at least about one hour before allowing it to cool.

2. The process of claim 1 wherein the preceramic binder has an alkali metal content of 0-5 ppm.

3. The process of claim 1 wherein the preceramic binder is a polysilazane prepared by reacting methyldichlorosilane with ammonia, treating the ammonolysis product with potassium hydride, and quenching the resultant product with dimethylchlorosilane.

4. The process of claim 1 wherein the preceramic composition comprises about 70-80% by weight of SiC powder and about 20-30% by weight of binder.

5. The process of claim 1 wherein the preceramic composition has a particle size not larger than about 105 micrometers.

6. The process of claim 1 wherein the molded composition is pyrolyzed to a temperature of about 1300° C. and the resultant ceramic part, after being cooled, is heated in air to about 1300° C. and kept in air at about 1300° C. for at least about one hour.

7. A process for preparing a ceramic which comprises (A) molding a preceramic composition having a particle size not larger than about 105 micrometers and comprising about 70-80% by weight of SiC powder and about 20-30% by weight of a preceramic polysilazane binder at a temperature of about 60°-225° C., said binder having an alkali metal content of 0-5 ppm and being a polysilazane prepared by reacting methyldichlorosilane with ammonia, treating the ammonolysis product with potassium hydride, and quenching the resultant product with dimethylchlorosilane, (B) pyrolyzing the molded composition in an inert atmosphere to a temperature of about 1300° C., (C) cooling the resultant ceramic part in an inert atmosphere to a temperature at least as low as about 800° C., (D) heating it in air to about 1300° C., and (E) keeping it in air at about 1300° C. for at least about one hour before allowing it to cool.

* * * * *